June 7, 1938.  F. P. MOREA  2,119,597
HEADLIGHT FOR VEHICLES
Filed Oct. 26, 1937  2 Sheets-Sheet 2

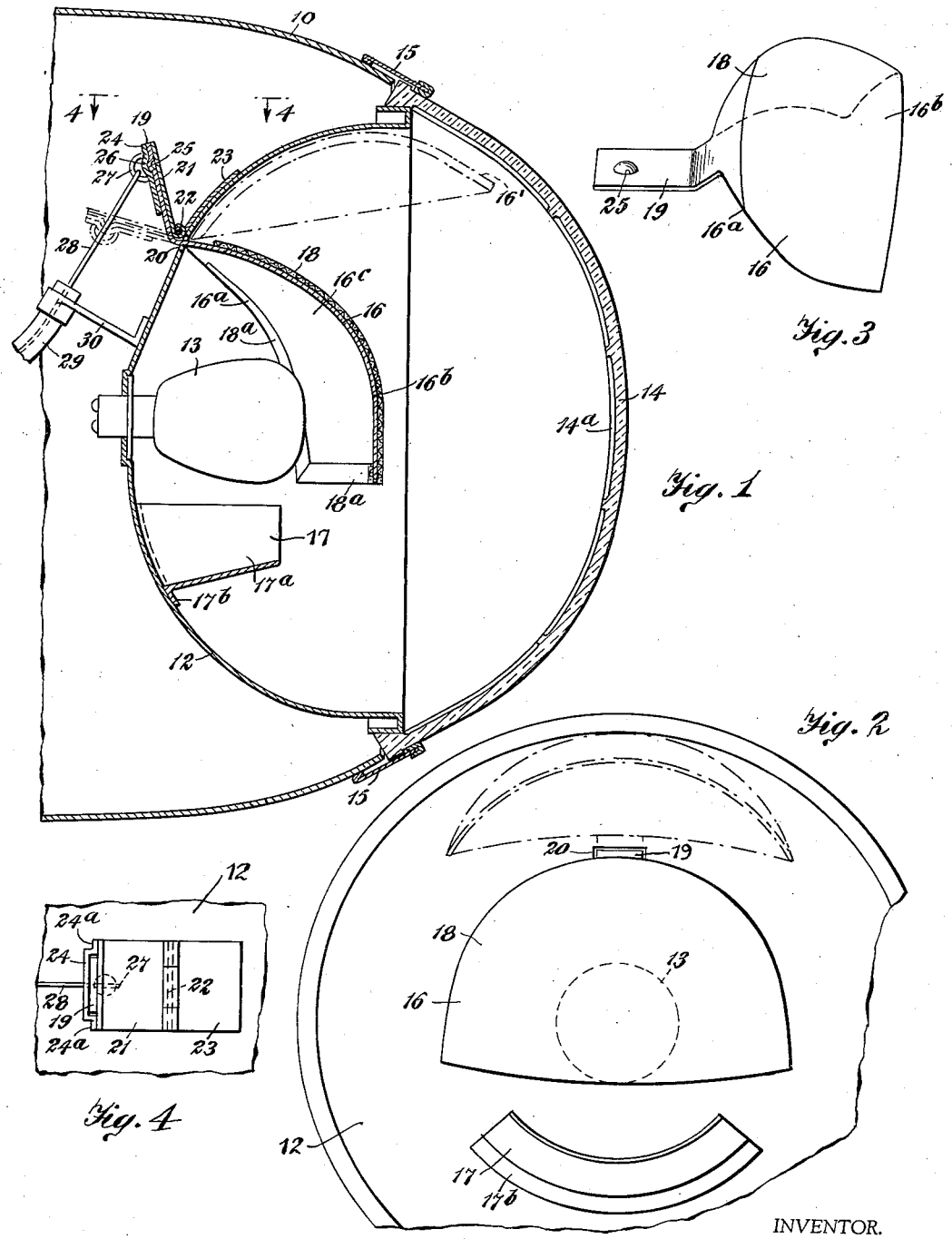

INVENTOR.
FRANK P. MOREA
BY
ATTORNEY.

UNITED STATES PATENT OFFICE 2,119,597

HEADLIGHT FOR VEHICLES

Frank P. Morea, Jackson Heights, N. Y., assignor of one-third to Emil John Weinheim and one-third to Victor N. Morea, both of Flushing, N. Y.

Application October 26, 1937, Serial No. 171,006

4 Claims. (Cl. 240—45)

This invention relates to new and useful improvements in headlights for vehicles.

The invention has for an object the construction of a headlight which is characterized by the fact that it includes a reflector, a lamp, and shields arranged in a particular manner for cutting off the direct rays of the lamp to make the headlight non-glare.

It is proposed to arrange the shields in a manner so that the direct and sharp light rays from the lamp are converted into soft beams of indirect light strong enough to light up the road ahead from a distance of 200 to 300 feet, clearly defining the road, the width, the edge of the road on the right side of the vehicle, the turns, to be of perfect safety to the vehicle and driver. It is proposed to accomplish the illumination with the standard lamp now used in a vehicle headlight.

The invention contemplates arranging the shields in a manner so that the rays of light from the lamp are cut off from certain portions of the reflector of the headlight, and it is proposed to provide the shields with reflecting surfaces to reflect the cut off light rays in a predetermined manner; specifically, out horizontally at a predetermined altitude and downwards on the road.

A further object of the invention resides in converting the direct glaring light rays from a headlight into indirect and secondary light rays so that they may be utilized for illumination purposes.

A further object of the invention is to provide a mechanism by which the shields may be moved from their normal positions in which they cut off and change the direction of the direct glaring rays, to positions in which they are inoperative, so that the rays from the direct rays of the headlight lamp are unobstructed. The invention recognizes that under certain conditions and circumstances it may be advisable to permit the headlights to function unobstructed in the manner in which they now function, and it is with this realization in mind that the control of the shields has been developed.

The invention proposes mechanism operable from the driver's seat to control the positions of the shields of the headlights or other lights of a vehicle so as to be partially or fully operative.

It should be understood that the invention has been shown on the drawings applied to one particular type of headlight, but this is not intended as a limitation since it is recognized that the same invention and principle may be applied to various types of headlights now in use, and their application in various positions on a vehicle. The particular headlight illustrated on the drawings which has been selected to disclose the invention is one in which the lamp is mounted at the rear, in the center of the reflector. Other types to which the invention may apply in the identical form may be those in which the lamps are mounted at the sides or top of the reflector of the headlight.

For each different type of headlight the invention proposes a minimum of two shields; one of cup form to extend over the lamp and shield light rays directed towards the top and towards the front, and to reflect these light rays downwards. The second shield which is proposed is beneath the lamp spaced slightly from the top shield and serving to direct all downward reflected rays back upon the reflector so that they are then reflected outwards horizontally to the front, and laterally towards the sides.

An important object of the invention resides in the particular mounting of one or more of the shields in a manner so that it, or they, may be drawn outwards to remove same from the headlight, or re-engaged in operative positions, and in the operative position or positions to be directly connected with mechanism by which it or they may be moved.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a fragmentary vertical sectional view of a headlight constructed according to this invention.

Fig. 2 is a front elevational view of a headlight shown in Fig. 1.

Fig. 3 is a perspective view of the top shield.

Fig. 4 is a fragmentary view looking in the direction of the line 4—4 of Fig. 1.

Figure 6:
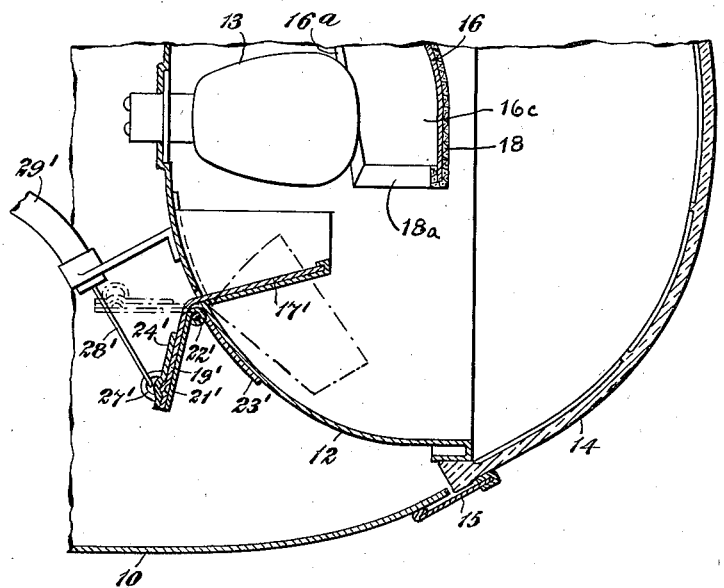
Fig. 6 is a fragmentary view similar to a portion of Fig. 1 but showing another embodiment of the invention.
Figure 5:
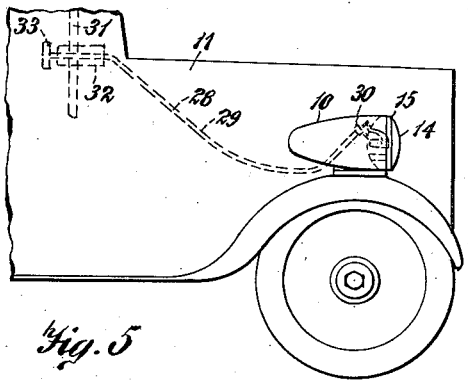
Fig. 5 is a fragmentary side elevational view of a vehicle with a headlight constructed according to this invention applied thereto.

The non-glare headlight for vehicles, according to this invention, includes a headlight body 10 adapted to be mounted on a vehicle 11 and having a reflector 12 for concentrating the rays of a lamp 13. The reflector 12 is supported immediately behind a glass globe 14 or lens. This globe 14 may be formed with a cut inner face 14a adapted to refract the light rays according to known theories of headlight design. The globe 14 is supported by an annular support element 15 which is mounted on the body 10.

A cup shaped shield 16 has a rear edge 16a formed to fit the contour of the reflector 12 and has a front portion 16b extending over and covering the lamp 13 to cut off horizontal rays and upwardly directed rays. A bottom shield 17 is mounted on the reflector 12 and is spaced a short distance from the lamp 13 and the cup shaped reflector 16. A remote control means is provided for moving the cup shaped shield 16 from its position over the lamp, and is controlled from a remote point of the vehicle.

The cup shaped shield 16 has its inner surface 16c highly polished, forming a reflecting surface. The outer surface is of a dull finish, preferably covered by soft sheet material 18 which also acts as a protective material and sound deadening material. This material 18 may be a thin sheet of felt or rubber material. Its edges 18a are bent around the free edge of the cup shaped shell 16 for finishing same. The arrangement is such that the cup shaped shell may be moved upwards to an inoperative position, indicated by the numeral 16', and in this latter position the material 18 will engage against the reflector 12 to shield the reflector against damage and to cushion the noise which would be made if the metallic shield 16 would strike the metallic reflector.

The bottom shield 17 has its inner surface 17a polished, or in any other manner formed with a reflector surface. The bottom reflector 17 has a flange portion 17b by which it is permanently secured upon the reflector 12. This bottom reflector 17 is slightly arcuate and spaced from the lamp 13 and the cup shaped shield 16 as clearly shown in Fig. 2.

The cup shaped shield has a finger element 19 extending from its rear edge 16a, at its center, and through a rectangular opening 20 formed in the reflector 12. Adjacent the opening 20 and mounted on the back of the reflector 12 there is a leaf 21 which is pivotally supported by a pintle 22, in turn supported by a leaf 23 attached to the back of the reflector 12. The leaf 21 is provided with a holding element in the form of a strip 24 secured at its edges 24a (see Fig. 4) to the edges of the leaf 21. This holding element 24 forms a passage into which the finger element 19 engages.

The finger element 19 is formed with a pressed-out portion 25 which is cooperative with a complementary pressed-out portion 26 formed in the support element 24. The arrangement is such that when the finger element 19 is engaged in the space between the holding element 24 and the leaf 21 it will resiliently maintain its position by reason of the pressed-out portions 25 and 26 engaging each other.

A ring element 27 is mounted upon the support element 24. A flexible wire 28 pivotally connects with the ring element 27 and extends through a flexible tube 29 which is supported by a bracket 30. The flexible tube 29 and the flexible wire 28 extends to the dashboard 31 of the vehicle 11. At the dashboard the tube 29 connects with a tubular member 32. The wire 28 frictionally extends through the tubular member 32 to the exterior thereof at the front of the dashboard 31. A head element 33 is mounted on the outer end of the wire 28. The arrangement is such that the head element 33 may be pulled to draw out the wire 28 and may be moved inwards to push the wire 28 inwards. Due to friction the wire 28 will maintain any position into which it is moved. As the wire 28 is moved inwards or outwards it will cause the pivoting of the leaf 21 and so indirectly the pivoting of the cup shaped shield 16. The dot and dash lines 16' in Fig. 1 indicate a position of these parts in which the shield 16 is completely moved away from the lamp 13, and in this specification, called its inoperative position.

In Fig. 6 another embodiment of the invention has been disclosed which distinguishes from the prior form merely in the fact that the device has a bottom shield 17' which is pivotally supported and associated with a means by which it may be held in various pivoted positions. More specifically, the bottom shield 17' has a finger element 19' engageable in the space between a support element 24' and a leaf 21'. This leaf 21' is pivotally supported by a pin 22' connected with a leaf 23' stationarily mounted on the back of the reflector 12. A ring element 27' is mounted on the support element 24' and is connected with a flexible transmission wire 28' which extends through a stationary tube 29'. The parts are so arranged that the wire 28' may be moved to various positions to pivot the bottom shield 17'. The dot and dash lines in Fig. 6 show the extreme position of the bottom shield 17'.

The operation of the headlight is as follows:—

Normally, the cup shaped shield and the bottom shield are in the positions shown in full lines on the drawings. In these positions all the glaring rays from the headlight are cut off. It is essential that the shields be so located relative to each other and relative to the reflector, and the lamp, that a maximum amount of light is projected from the headlight without the glaring effect. The top shield should be so positioned over the lamp that all direct horizontal and upwardly directed rays are cut off and reflected into outwardly and downwardly projecting rays. The bottom shield cooperates with the top shield in reflecting the rays which are reflected by the top shield indirectly into the direction desired. The top and bottom shields are so located relative to each other that the lateral light rays are not restricted so that a relatively flat beam of light emanates.

The top shield, or both shields, are pivotally supported in a manner so that they may be controlled from a remote point. For example, they may be controlled from the driver's seat of the vehicle. It is possible for the driver to adjust the shields to various pivoted positions so as to permit some glaring rays to emanate, or to permit a large quantity of glaring rays to emanate. Under certain conditions of driving this may be required or desirable, and it is for this reason that the adjustment has been arranged.

An important feature of the invention resides in the fact that when desired the globe of the headlight may be removed and the shields which are supported in the sockets formed by the hinged leaf and its support member may be directly drawn out. When so drawn out the adjustment mechanism is not disturbed or changed. Consequently, the shield may be re-engaged in position when it is required that it be used again. When drawn out the reflector of the headlight is unobstructed and may be used in the conventional manner. The only difference between it and one which is not provided with the invention is that there will be a small opening (the opening 20) in the one provided with the invention through which the finger element (the element 19) by which the shield (or shields) is supported, is extended through.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new and desire to secure by United States Letters Patent is:—

1. In combination with the reflector and lamp of a headlight for vehicles and the like, a cup shaped shield having a rear edge to fit the contour of the reflector and the front portion thereof extending over and covering said lamp to cut off certain rays, a tubular leaf pivotally mounted on the rear face of said reflector, means for moving said leaf operable from a remote point, a finger element extending from the rear edge of said shield and projecting through an opening in the rear of said reflector and engaging into said tubular leaf, and resilient means for releasably holding said finger and leaf together so that the said shield will be movable to various positions over said lamp by the means for moving the leaf and in all positions may be removed by the mere pulling of the finger out of the leaf.

2. In combination with the reflector and lamp of a headlight for vehicles and the like, a cup shaped shield having a rear edge to fit the contour of the reflector and the front portion thereof extending over and covering said lamp to cut off certain rays, a tubular leaf pivotally mounted on the rear face of said reflector, means for moving said leaf operable from a remote point, a finger element extending from the rear edge of said shield and projecting through an opening in the rear of said reflector and engaging into said tubular leaf, and resilient means for releasably holding said finger and leaf together so that the said shield will be movable to various positions over said lamp by the means for moving the leaf and in all positions may be removed by the mere pulling of the finger out of the leaf, said resilient means comprising inter-engaging pressed out portions on said leaf and finger.

3. In combination with the reflector and lamp of a headlight for vehicles and the like, a cup shaped shield having a rear edge to fit the contour of the reflector and the front portion thereof extending over and covering said lamp to cut off certain rays, a tubular leaf pivotally mounted on the rear face of said reflector, means for moving said leaf operable from a remote point, a finger element extending from the rear edge of said shield and projecting through an opening in the rear of said reflector and engaging into said tubular leaf, and resilient means for releasably holding said finger and leaf together so that the said shield will be movable to various positions over said lamp by the means for moving the leaf and in all positions may be removed by the mere pulling of the finger out of the leaf, said tubular leaf comprising a hinge, one of the arms of which is fixedly mounted on said rear face of the reflector, and a hollowed out support mounted on the other arm.

4. In combination with the reflector and lamp of a headlight for vehicles and the like, a cup shaped shield having a rear edge to fit the contour of the reflector and the front portion thereof extending over and covering said lamp to cut off certain rays, a tubular leaf pivotally mounted on the rear face of said reflector, means for moving said leaf operable from a remote point, a finger element extending from the rear edge of said shield and projecting through an opening in the rear of said reflector and engaging into said tubular leaf, and resilient means for releasably holding said finger and leaf together so that the said shield will be movable to various positions over said lamp by the means for moving the leaf and in all positions may be removed by the mere pulling of the finger out of the leaf, said tubular leaf comprising a hinge one of the arms of which is fixedly mounted on said rear face of the reflector, and a hollowed out support mounted on the other arm, and said opening in the reflector being at the pivot point of said hinge.

FRANK P. MOREA.